3,321,493
EPOXIDATION
Stanley Beesley, Darley Abbey, Derby, and John Bernard Powner, Chaddesden, Derby, England, assignors to British Celanese Limited, County of London, England, a British company
Filed Dec. 3, 1963, Ser. No. 327,650
Claims priority, application Great Britain, Dec. 20, 1962, 48,074/62
7 Claims. (Cl. 260—348.5)

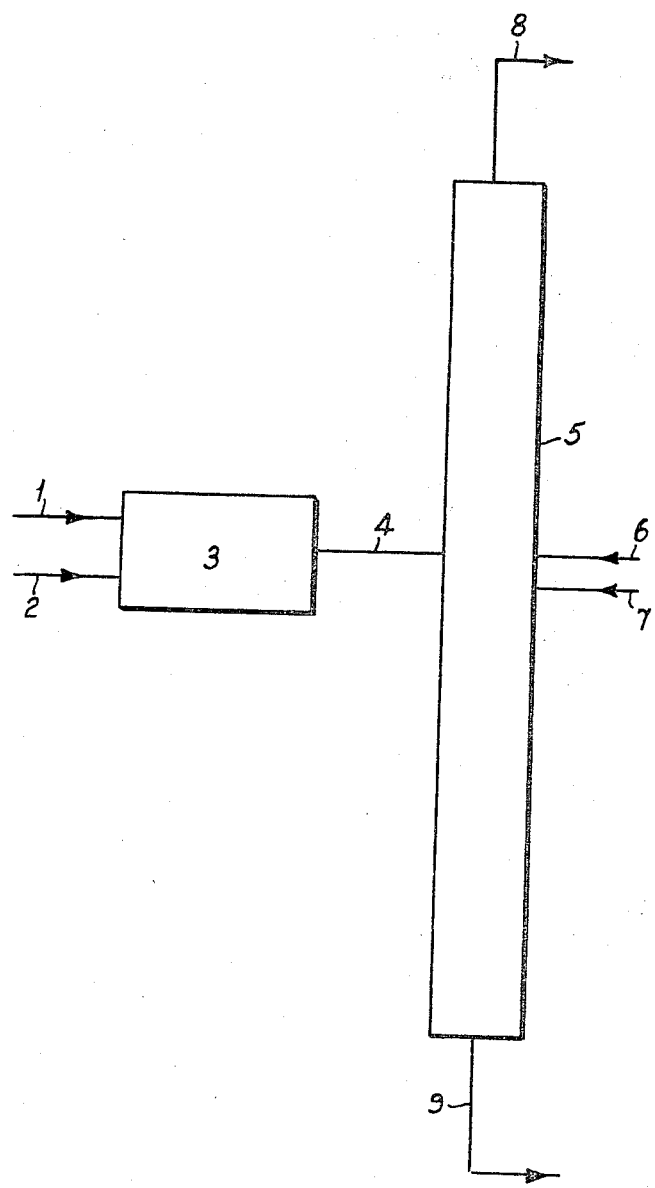

This invention relates to the production of chemical compounds, and in particular to the production of epoxidized organic compounds by the reaction of peracetic acid with unsaturated hydrocarbons and unsaturated esters. The invention is specifically concerned with the epoxidation of oils such as soya-bean oil, tall oil esters, linseed oil and the marine oils, as well as olefines the molecule of which contains at least 7 carbon atoms, such as 1-dodecene ($C_{12}H_{24}$) or the polybutadienes.

In the manufacture of peracetic acid, it is known to react acetaldehyde with oxygen to produce peracetic acid either by direct reaction as described for example in Bludworth's United States patent specification No. 2,314,385 or through the intermediary compound acetaldheyde monoperacetate; an example of the latter type of process is described in the Phillips et al. United States Patent No. 2,803,473.

The peracetic acid formed may be extracted from the reaction product by means of a solvent such as acetone, methyl acetate or ethyl acetate in an extraction column from the top of which unreacted gases are removed and from the base of which a solution of peracetic acid, which inevitably contains some acetic acid, is removed.

In accordance with this invention, the unsaturated hydrocarbon or ester to be oxidized is fed into a column into which the peracetic acid as it is produced, together with some acetic acid, and an extraction solvent also, are being fed so that the oxidation of the ester or olefine takes place within the column and a solution of the required oxidation product in acetic acid together with the added solvent is withdrawn from the base of the column. The epoxidized product can then be recovered from the withdrawn solution by standard distillation or extraction techniques. It will be appreciated that any solvent which is used should be suitably selected to permit a ready separation of the product to be achieved.

Solvents having a boiling point in the range of 30–80° C. are suitable for use in this invention. The preferred solvent is acetone although other solvents, for example methyl acetate or ethyl acetate, can be used.

In carrying out the process of this invention the unsaturated ester or hydrocarbon may be fed as separate streams to the extraction column or a solution of the unsaturated compound in the solvent may be fed to the column through one feed pipe. Furthermore, it is not necessary for the epoxidation of the ester or hydrocarbon to be completed within the column. A partially reacted product containing unepoxidized oil and free peracetic acid may be withdrawn from the column and stored in a holding vessel at elevated temperature, for example 60–70° C., while the reaction goes to completion.

The process of this invention is applicable to any unsaturated ester or hydrocarbon which is capable of being epoxidized by peracetic acid. The unsaturated compound used however must have a boiling point above 21° C., the boiling point of acetaldehyde, and should preferably be sufficiently higher than this to permit ready separation using standard distillation techniques.

The present invention is simple to operate and, since the peracetic acid is used within a short time of its preparation, the danger of explosion is considerably reduced. The process also appreciably reduces the loss of peracetic acid due to decomposition as it flows down the extraction column.

In carrying out this invention it is preferred to use the peracetic acid in slight excess over the theoretical amount required to epoxidize the unsaturated compound; an excess of 0.5 to 5 percent by weight is suitable. In this manner products having high epoxy contents are obtained on removal of the solvent and the acetic acid by distillation or other means. Separate purification of the epoxidized product may not then by required and the product can be used direct as a plasticizer.

The accompanying drawing illustrates diagrammatically a suitable apparatus for carrying out this invention. Acetaldehyde vapor, through pipe 1, and oxygen, through pipe 2, are fed to a reactor 3 where peracetic acid is formed and passed direct through pipe 4 to an extraction column 5. Acetone through pipe 6 and an unsaturated hydrocarbon or ester, for example soya-bean oil, through pipe 7 are fed to the column 5. Unreacted gases together with some acetone pass out through pipe 8 and after any necessary adjustments, a portion of the unreacted acetaldehyde is recirculated to the reactor 3. A solution of the reaction product, for example epoxidized soya-bean oil, in acetone-acetic acid is recovered from pipe 9 at the base of the column 5. It is convenient but not essential to have the two feed pipes 6 and 7 close to each other near the point of entry of the peracetic acid through pipe 4.

The invention is illustrated by the following examples, in which the apparatus used was substantially as shown in the accompanying drawing. Percentages are by weight.

*Example 1*

Acetaldehyde vapor at a rate of 10 gram mols/hour and oxygen at a rate of 1 gram mol/hour were fed into a reactor heated to 157° C. The mixture of acetaldehyde and peracetic acid so formed was passed to a fractionation column into which was also fed 5.8 gram mols/hour of acetone and 89 grams/hour of soya-bean oil of iodine value 134.

The temperature of the column base was 74° C. and that of the head was 38° C. so that a mixture of acetaldehyde, acetone and a small amount of acetic acid distilled over the head.

The residence time in the base was 45 minutes and the product withdrawn from the base at a rate of 240 grams/hour contained 39.6 percent by weight of epoxy soya-bean oil. The product was maintained at 70° C. for a further 30 minutes to allow the reaction to go to completion.

Acetone was removed from the product by distillation at 300 mm. mercury. The residue was dissolved in petroleum ether and acetic acid removed by extraction with water. The solution was then washed with dilute solutions of sodium hydroxide and oxalic acid. Finally the petroleum ether was distilled off leaving an epoxy soya-bean oil containing 6.84 percent epoxy oxygen and having an iodine number of 2 and a colour less than 1 Gardner unit. After heating for 30 minutes at 180° C. the product had a colour between 1 and 2 Gardner units.

*Example 2*

The reaction conditions used were the same as those set out in Example 1 but with an acetone feed of 6.03 gram mols/hour, a soya-bean oil feed of 77 grams/hour and a residence time of 48 minutes in the column base. The solution was withdrawn from the base of the column at a rate of 245 grams/hour; it contained 33.0 percent by weight of epoxy soya-bean oil.

The product which was separated as described in Example 1 had an epoxy oxygen content of 6.70 percent, an iodine value of 1 and a colour of less than 1 Gardner unit.

Example 3

The reaction conditions were similar to those of Example 1 but with an acetone feed of 5.60 gram mols/hour and a soya-bean oil feed of 57 grams/hour. The solution was withdrawn from the base of the column at a rate of 184 grams/hour to give a base residence time of 65 minutes. The base product contained 26.1 percent of epoxy soya-bean oil which was separated as described in Example 1. The epoxy soya-bean oil had an epoxy oxygen content of 6.50 percent, an iodine number of 1 and a colour less than 1 on the Gardner scale.

What we claim is:

1. In a process for the production of epoxidized unsaturated oils by reacting an unsaturated oil, with peracetic acid, the steps of reacting oxygen with acetaldehyde in the vapor phase to produce a gaseous mixture consisting essentially of peracetic acid, acetic acid and acetaldehyde, passing said gaseous mixture, as it is produced, into a column, introducing into said column two components consisting essentially of said oil and a solvent selected from the group consisting of acetone, methyl acetate and ethyl acetate thereby to epoxidize said oil in said column, and withdrawing a solution of the epoxidized oil in a mixture of acetic acid and solvent from the base of the column.

2. The process claimed in claim 1 wherein the unsaturated compound is soya-bean oil.

3. The process claimed in claim 1 wherein the quantity of peracetic acid passed into said column is in an excess of 0.5 to 5% by weight over the theoretical amount required to epoxidize the unsaturated oil completely.

4. In a process for the production of epoxidized unsaturated oils by reacting an unsaturated oil with peracetic acid, the steps of reacting oxygen with acetaldehyde in the vapor phase to produce a gaseous mixture consisting essentially of peracetic acid, acetic acid and acetaldehyde, passing said gaseous mixture, as it is produced, into a column, introducing into said column two components consisting essentially of said oil and a solvent selected from the group consisting of acetone, methyl acetate and ethyl acetate thereby to epoxidize said oil in said column, withdrawing a solution of incompletely epoxidized oil in a mixture of acetic acid and solvent from the base of the column, said mixture containing free peracetic acid, and storing the withdrawn mixture at an elevated temperature to further reaction between the epoxidized compound and the peracetic acid.

5. The process claimed in claim 4 wherein the oil is soya-bean oil.

6. The process claimed in claim 4 wherein the peracetic acid passed into said column is in an excess of 0.5 to 5% by weight over the theoretical amount required to epoxidize the unsaturated oil completely.

7. The process claimed in claim 3 wherein the withdrawn solution is stored at 60 to 70° C.

References Cited by the Examiner

UNITED STATES PATENTS 2,833,813    5/1958    Wallace _____ 260—502

FOREIGN PATENTS 820,461    9/1959    Great Britain.
900,836    7/1962    Great Britain.

OTHER REFERENCES

John et al.: Chemistry and Industry, Jan. 13, 1962, pp. 62–69.

WALTER A. MODANCE, *Primary Examiner.*

NICHOLAS S. RIZZO, *Examiner.*

NORMA S. MILESTONE, *Assistant Examiner.*